Patented Apr. 15, 1952

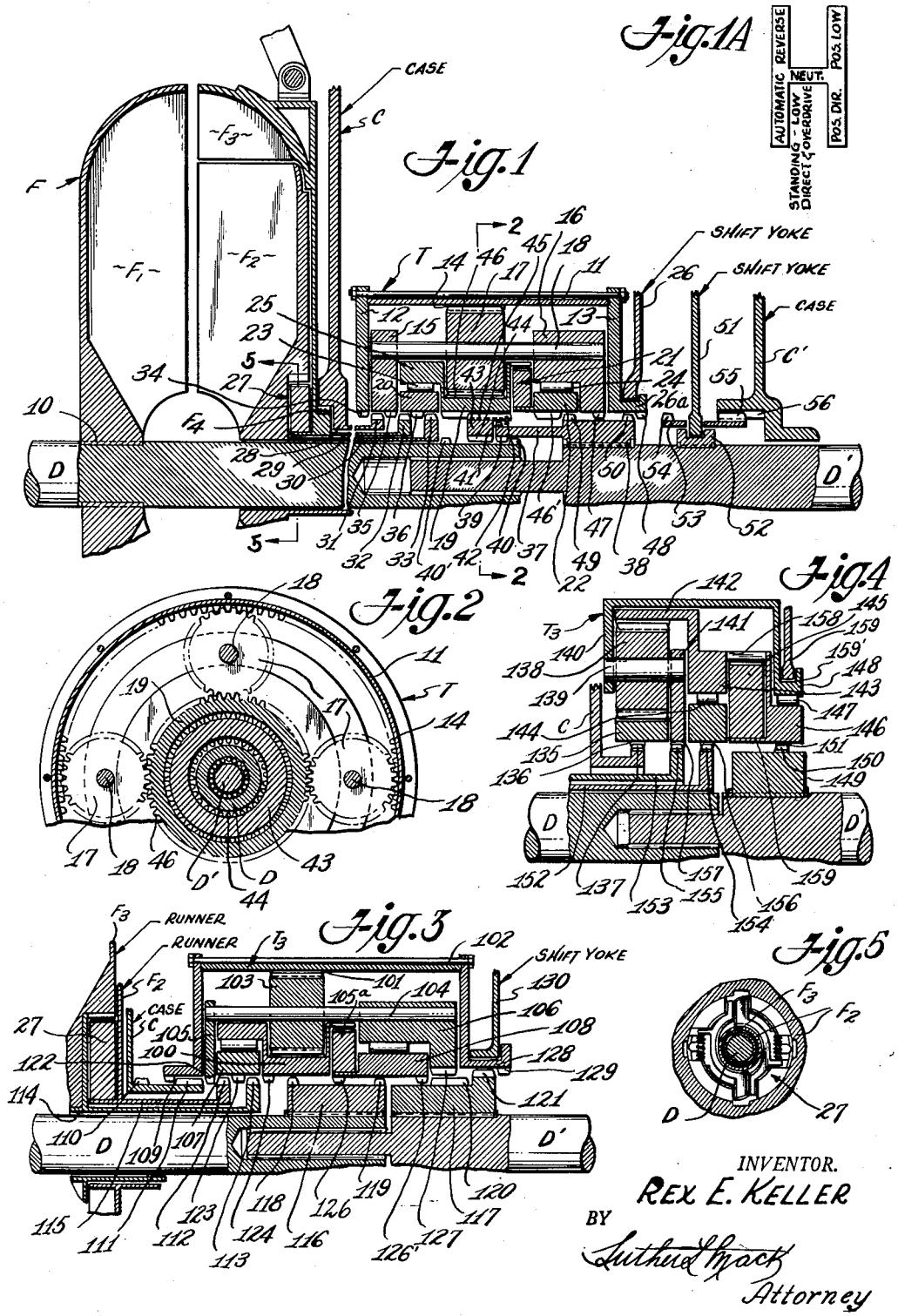

2,592,910

UNITED STATES PATENT OFFICE 2,592,910

POWER TRANSMISSION MECHANISM

Rex E. Keller, Beverly Hills, Calif.

Application June 7, 1948, Serial No. 31,533

21 Claims. (Cl. 74—688)

This invention comprehends the provision, generally considered, of a new and improved automatic transmission mechanism, particularly arranged to provide selective interconnections between a double runner fluid coupling unit and a sliding gear set including a single planetary gear unit having the following characteristics:

1. Automatic torque change from standing to low, to direct, to overdrive stages, in turn and return to standing stage in reverse order or direct from high to low gear.

2. Standing to overdrive and return through use only of foot operated accelerator and brake, providing a "toe-tip" control.

3. Positive reverse, positive low, and positive direct driving stages in addition; and 4. Other general and modified accessory features which will be hereinafter described and together with the aforesaid other features constitute the objects of this invention.

I have shown in the accompanying drawings preferred and modified forms of a mechanism embodying my invention, in which:

Fig. 1 is a partial longitudinal section of a primary form and arrangement of parts and elements embodying my invention;

Fig. 1a is a shifting diagram showing different stages of operation in well known H form;

Fig. 2 is a partial transverse section of the mechanism in the plane of line 2—2 of Fig. 1;

Fig. 3 is a view similar to Fig. 1, but slightly modified to show means for shifting only a planetary gear unit for providing lock-ups and all different stages of operation, automatic and positive;

Fig. 4 is a partial longitudinal section showing an arrangement somewhat similar to and for the same purpose as that of Fig. 1 but with the elements of the unit differently arranged for interconnection; and Fig. 5 is a reduced scale view of a typical automatic clutch embodied in the mechanism.

Referring first to Fig. 1, it will be noted that the form of mechanism shown includes a fluid coupling unit generally represented at F which embraces an impeller and a pair of concentric runners $F_2$ and $F_3$. Impeller $F_1$ is fixed at 10 to a drive shaft D and runners $F_2$ and $F_3$ are loosely supported on shaft D but are drivingly connected with other elements as will be hereinafter explained, runner $F_3$ being free-wheelingly connected with case C at $F_4$.

A shiftable transmission set T is carried on shaft D and an axially aligned driven shaft D' which partially telescopes shaft D as shown. Set T includes a cylindrical housing formed with a circular wall 11 and end walls 12 and 13; a planetary gear unit comprising an orbit gear 14 fixed to or formed on wall 11, spaced carrier discs 15 and 16, pinions 17 supported on discs 15 and 16 by shafts 18, a sun gear 19, an internally toothed member 20 surrounding shaft D, an automatic clutch 21 having a driving element 22, and free wheeling clutches 23 and 24 mounted, respectively, between an annular rim 25 of sun gear 19 and member 20, and between element 22 of clutch 21 and carrier disc 16.

Unit T is adapted to be longitudinally shifted as by means of a yoke 26 engaging a collar 27 on wall 13 of the housing. The gear and lock-up elements of transmission T are arranged for selective connections with case C, fluid coupling runners $F_2$ and $F_3$, driving shaft D, driven shaft D' and a second fixed case member C' as shown in Fig. 1, and otherwise connected as shown in Figs. 2 to 6, inclusive.

As shown in Fig. 1, runners $F_2$ and $F_3$ can be at times connected as by means of a typical automatic clutch 27 having the characteristics shown in Fig. 5, or otherwise, and arranged so that at times one of the pair of runners may overrun the other and when synchronized above certain speeds will be locked together for rotation as a unit. In such a clutch connection, one of the runners as at $F_3$, as shown, serves as a driver while the other runner $F_2$ is a driven element.

Case C and runners $F_3$ and $F_2$, respectively, have telescoping coaxial extensions 28, 29, and 30 leading therefrom to points within housing T and are formed with external teeth 31, 32, and 33, respectively, adapted for selective clutching engagement with elements of unit T in the manner hereinafter explained. Elements 12, 15, and 20 of unit T have internal teeth or splines 34, 35, and 36 adapted for selective engagement with sets of teeth 31, 32, and 33, when the unit T is bodily shifted in opposite directions. A sleeve 37 is fixed at 38 (Fig. 1) to driven shaft D' and bears internal teeth 39 adapted at times to engage external teeth 40 on driving shaft D for affording a positive direct driving connection between shafts D and D'. Sleeve 37 also has external teeth 41 and a retaining ring 42 is held on collar 43 for confining teeth 41 between ring 42 and collar 43, said collar having internal teeth 44 and external splines 45, with splines 45 continuously engaging internal teeth 46 on sun gear 19, teeth 44 being arranged for selective engagement with teeth 40 and 40' on shaft D for positive low gear drive.

Element 22 of clutch 21, carrier element 16, and housing portion 26a carry internal teeth 46', 47, and 48 respectively arranged for selective engagement with external teeth 49 and 50 on sleeve 37. Shaft D' is rendered axially shiftable by means of a yoke 51 engaged with a shift collar 52 fixed to shaft D' and a sleeve 53 is shiftable simultaneously with and by yoke 51 and has teeth 54 and 55 thereon for respectively engaging clutch teeth 48 of member 13 and clutch teeth 56 on fixed case C'.

In operation, when unit T is bodily shifted to the right to provide a first stage set of conditions the vehicle motor idles and complete slippage occurs in the fluid coupling. For second stage (low gear connections) the shifting of unit T to right has locked up runner $F_2$ with an annular member 20 so that torque applied from impeller $F_1$ to runner $F_2$, thence through member 20, free-wheeling clutch 23 to sun gear 19, and thence through pinions 17 and shafts 18 to carrier elements 15 and 16, wall 12 of the unit housing being fixed to case C through lock-up of clutch teeth 34—34. The drive is thus through elements 16, 24, 46', 49, and 37, and shaft D'.

For establishing third stage (direct drive) connections, the meshing of clutch teeth 31 and 35 directly applies torque to shaft D' through carriers 15—16, shaft 18, elements 24, 22, 46', 49, and 37 because the reduced car torque and increased centrifugal force of the fluid in coupling F enables impeller $F_1$ to rotate runner $F_3$ with direct effect, sun gear 19 operating at overdrive speed, but being unconnected, free wheels away from runner $F_2$ and member 20.

Clutch 21 is effective at stages above low gear for connecting runners $F_2$ and $F_3$ so as to obtain increased fluid coupling efficiency at slower motor speeds for both direct and overdrive operations, but is not essential for effecting automatic change between low and direct drive, because such changes are made unconsciously while accelerating due to a relative increase of fluid pressure on runner $F_3$ which allows said runner alone to drive the vehicle.

For a fourth stage (overdriving) lock-up: At a predetermined speed or at any speed thereabove the foot of a driver is raised from the accelerator and clutch 21 becomes operative through the synchronization and locking of its driving and driven elements, thereby operatively connecting 22, 37, and D' directly to sun gear 19 which, as previously stated, is operating at overdriving speed. Also, element 22 free-wheels away from element 16 by reason of clutch 24.

It is to be noted that when in "automatic" stage (Fig. 1a) the mechanism free-wheels in low and direct driving lockups but is "positive" when overdrivingly arranged thereby providing greater safety at higher speeds and easier shifting (if necessary) at lower speeds than has been heretofore possible.

For establishing reverse driving connections, unit T is shifted to the left, thereby locking carrier 15 to case C through teeth 35—31; runners $F_2$ and $F_3$ will then rotate sun gear 19 forwardly through teeth 46—36 while housing of unit T rotates reversely, and drives shaft D' through teeth 48, 50, and sleeve 37, sun gear 19 being positively connected with runner $F_2$ through teeth 46—33.

A positive direct drive is effected when shaft D' is shifted to the right by yoke 51, thereby engaging clutch teeth 39 and 40. Such operation connects the rear wheels of the vehicle with the motor through the consequent direct connection of shafts D and D', and eliminates all gears and the fluid coupling F entirely.

Positive low gear drive is effected by shifting shaft D' to the left, thereby connecting shaft D with sun gear 19 through clutch teeth 46—44 (sleeve 37 moving unit T to left) while housing wall 13 is fixed to case C' by engagement of clutch teeth 48—54 and 55—56, sleeve 53 being moved with shaft D' carrier member 16 serving to drive element D' through engagement of teeth 47—50. In this event direct connection with the vehicle motor is provided.

The type of transmission shown in Fig. 3 is similar to that of Fig. 1, except that it requires but one shift yoke and only the planetary gear set is shifted to obtain all desired lock-ups, four-stage automatic, neutral, positive reverse, positive low, and positive direct. Housing $T_3$ encloses sun gear 100, orbit gear 101 fixed to wall 102 of the housing, pinions 103 on shafts 104 connecting carriers 105 and 106, an overdriving clutch 27, a sun gear driving element 107 and a carrier driving element 108.

Case C has its extension 109 formed with clutch teeth 110 and 111 and runners $F_2$ and $F_3$ have clutch teeth 112 and 113 formed on their telescoping extensions 114 and 115, respectively. A collar 116 is fixed to shaft D and a collar 117 is fixed to shaft D', said collar 116 having spaced teeth 118 and 119 and collar 117 having teeth 120 and 121 thereon. Carrier 105 has internal teeth 122 adapted to engage certain teeth of the driving elements, element 107 has internal teeth 123, sun gear 100 has internal teeth 124, element 108 has spaced internal teeth 126 and 126', carrier 106 has internal teeth 127 and portion 128 of housing $T_2$ has internal teeth 129 thereon.

Said sets of teeth are adapted to selectively interconnect the driving and driven elements of the transmission when the unit is bodily shifted as by means of a yoke 130 operating on portion 128 which serves as a shift collar.

All of the shifting necessary to change the driving speeds and direction is solely by shift yoke 130.

In Fig. 4 is shown a modification of the type of mechanism shown in Fig. 1, and generally for the same purpose. In this case the sun gear 135 is shown as locked to the case C against rotation by means of clutch teeth 136 and 137 on said members, respectively. A housing $T_3$ supports the other elements of a planetary gear set including planet gears 138 on shafts 139 which, in turn, are held on a wall 140 of said housing and a carrier disc 141, a free-wheeling orbit gear 142, a free-wheel clutch drive element 143 and associated rollers 144, and a centrifugal clutch 145 having a member 146 free-wheelingly connected at 147 with a portion 148 of housing $T_3$.

Driving shaft D and driven shaft D' are telescopically connected and shaft D' carries a fixed collar 149 adapted at times to be drivingly connected with element 146 as by means of teeth 150 and 151 on elements 149 and 146, respectively. Runners $F_2$ and $F_3$ (not shown) have telescoping extensions 152 and 153, respectively, with teeth 154 and 155 thereon for selective engagement with teeth 156 on element 143 and teeth 157 on element 141. In a first stage operation (low gear) the drive is from the inner runner through 152, 154, 156, 143, 144, 142, 138, 139, 149, housing $T_3$, clutch 147, 146, 151, 150, and 149 to driven shaft D'.

When the elements of the system are connected as shown in Fig. 4, while the sun gear 135 is locked against rotation the drive is from the outer runner $F_3$ to carrier disc 141, 139, and housing $T_3$ which all rotate forwardly together around the sun gear as in a second operating stage. Element 143 also rotates forwardly through its connection 154—156 with the inner runner $F_2$. In overdriving stage, the drive is from the outer runner to planetary carrier, thence through orbit gear 135 to and through automatic clutch 145, 146, 151, 150, and 149 to shaft D'.

The design of Fig. 4 affords a lock between the sun gear 135 and case C in order to provide leverage for low and overdrive and therein differs from the design of Fig. 1, and it affords the same automatic range of operation as in Fig. 1. Raising of the accelerator pedal is effective for establishing only an overdriving set-up in the design of Fig. 4.

An automatic clutch may be installed between runners $F_2$ and $F_3$ as in the design of Fig. 1, if desired. Shifting of the unit bodily is effected by a shift yoke as at 159 in Fig. 4, and operating on a collar 159'. This design shows only the automatic arrangement but can be modified to provide all shifts as in Figs. 1 and 3.

The essence of this invention is to provide in combination a fluid coupling unit having dual concentric runners of different area—the outer runner being of less area but of greater radius than the inner runner, and a set of shiftable gears adapted to be selectively connected with the two runners of the fluid coupling so as to provide both automatic and manually established operative stages.

With reference to the dual runner arrangement of the fluid coupling unit, it is obvious that the laws of centrifugal force applicable to fluids enables the transmission of the same amount of energy through a progressively smaller runner area as the radius increases and by still smaller runner areas as the speed increases; and by the application of this principle and the advantageous combination of the torque converter effect and a straight fluid clutch, I am enabled to attain completely automatic operation.

I claim:

1. A power transmission mechanism comprising: a first case fixed against rotation, a fluid coupling unit in said case including inner and outer concentric runners and an impeller, a drive shaft rotatable in and extended from said case and drivingly connected with said impeller, said case and said runners having externally toothed clutching members extended concentrically therefrom around said drive shaft and disposed in different transverse planes, a second stationary case, a driven shaft coaxial with said drive shaft and axially shiftable in said second case relative to the drive shaft, a planetary gear unit between said cases and bodily shiftable axially on said shafts, said gear unit including a housing, a sun gear, an orbit gear fixed to said housing, planet gears connecting said sun and orbit gears, a planet gear carrier, a first annular member free wheelingly connected with the sun gear, and a second annular member free wheelingly connected with said carrier, said sun gear, said carrier, said annular members and the end walls of said housing having sets of internal teeth axially spaced apart and said driven shaft having axially spaced sets of external teeth arranged to selectively interlock with certain internal sets of teeth on said members of the planetary unit when said unit is bodily shifted at times and when the driven shaft is shifted at times to drivingly connect the driven shaft with said runners through the planetary unit and selectively to directly connect the driving and driven shafts.

2. A power transmission mechanism as set forth in claim 1 in which one set of internal teeth on an end wall of said housing interlock with the external teeth on said first case simultaneously with the interlocking of one set of internal teeth on the carrier and of a second set of internal teeth on the carrier with the driven shaft, thereby locking the housing and orbit gear against rotation and applying torque to the driven shaft from the outer runner when the planetary unit is appropriately shifted.

3. A power transmission mechanism as set forth in claim 1 in which one set of internal teeth on an end wall of said housing interlock with the external teeth on said first case simultaneously with the interlocking of one set of internal teeth on the carrier and of a second set of internal teeth on the carrier with the driven shaft, thereby locking the housing and orbit gear against rotation and applying torque to the driven shaft from the outer runner when the planetary unit is appropriately shifted, and also drivingly connecting the inner runner with said first annular member and the sun gear through its free wheeling connection with said first annular member.

4. A power transmission mechanism as set forth in claim 1 in which the driving shaft and driven shaft have sets of external and internal teeth, respectively, adapted to interlock when the driven shaft is axially shifted, affording a direct driving connection with the driven shaft.

5. A power transmission mechanism as set forth in claim 1 in which the driving shaft and driven shaft have sets of external and internal teeth, respectively, adapted to interlock when the driven shaft is axially shifted, affording a direct driving connection with the driven shaft, and simultaneously therewith drivingly connecting the driven shaft with said housing.

6. A power transmission mechanism as set forth in claim 1 in which the driving shaft and driven shaft have sets of external and internal teeth, respectively, adapted to interlock when the driven shaft is axially shifted, affording a direct driving connection with the driven shaft, a sleeve embracing the driven shaft between the planetary housing and said second fixed case and having external sets of teeth adapted to lockingly connect said housing and said second case when the driven shaft is unlocked from the drive shaft.

7. A power transmission mechanism as set forth in claim 1 including a centrifugal clutch having a driving member rotatable with said second annular member and a driven member rotatable with said sun gear and automatically operative upon synchronization of its members to permit the sun gear to overrun the second annular member and afford an overdriving connection.

8. A power transmission mechanism as set forth in claim 1 in which all of the interlocking mechanism for providing the driving connections are within said housing.

9. A power transmission mechanism as set forth in claim 1 in which all of the interlocking mechanism for providing the driving connections are within said housing, and means for axially shifting said planetary unit.

10. A power transmission mechanism as set forth in claim 1 in which all of the interlocking mechanism for providing the driving connections are within said housing, and means for independently shifting said driven shaft.

11. A power transmission mechanism as set forth in claim 1, including an automatic centrifugal clutch connecting said inner and outer runners arranged so that one runner may at times overrun the other runner.

12. A power transmission mechanism as set forth in claim 1 including a collar permanently locked to said sun gear and having an internal clutch adapted to interlock with a set of teeth on the drive shaft so as to positively drive the sun gear and establish a positive low gear driving connection with the driven shaft.

13. A power transmission mechanism comprising coaxial driving and driven shafts, each shaft having sets of external teeth thereon, means for axially shifting the driven shaft relative to the driving shaft, a multiple runner fluid coupling unit having an impeller drivingly connected with the driving shaft and a plurality of runners adapted to receive power from said impeller and having concentric power take-off extensions provided with external clutching teeth, and a planetary gear unit including a sun gear, an orbit gear, planetary gears, a planet gear carrier and a housing, said unit being bodily shiftable axially on said shafts, members of said planetary unit having sets of internal teeth so disposed axially as to drivingly connect the driving and driven shafts through selected members of the planetary unit so as to interlock the internal sets of teeth of selected members of said unit with selected external sets of teeth on said runners and said shafts in response to the axial shifting of the planetary unit and the driven shaft, to vary the forward speed of the driven shaft and to reverse the direction of rotation of the driven shaft, in accordance with driving requirements.

14. A power transmission mechanism as set forth in claim 13 including an automatic centrifugally operative clutch between two of the runners of said fluid coupling so that at times one runner may overrun the other runner.

15. A power transmission mechanism as set forth in claim 13 in which said carrier includes spaced cross connected members, one of which embraces the driving shaft while the other member embraces the driven shaft, said carrier members adapted to be locked through the internal teeth thereon, at times, to the driving and driven shafts, respectively, and an automatic centrifugal clutch free wheelingly connecting one of the carrier members and the sun gear of the planetary set, for correspondingly applying torque to the driven shaft when said free wheelingly connected carrier member is locked to the driven shaft.

16. A power transmission mechanism as set forth in claim 13 in which said carrier includes spaced cross connected members, one of which embraces the driving shaft while the other member embraces the driven shaft, said carrier members adapted to be locked through the internal teeth thereon, at times, to the driving and driven shafts, respectively, and an automatic centrifugal clutch free wheelingly connecting one of the carrier members and the gun gear of the planetary set, for correspondingly applying torque to the driven shaft when said free wheelingly connected carrier member is locked to the driven shaft, the other carrier member adapted to be selectively locked to one of said runners so that torque is applied to the driven shaft therefrom through said carrier.

17. A power transmission mechanism as set forth in claim 13 including a stationary case between the fluid coupling unit and the planetary gear set with an extension having external teeth in said housing, one carrier member and an adjacent end wall of said housing adapted to selectively interlock with sets of teeth on said case, respectively, when the planetary unit is axially shifted in opposite directions so as to selectively lock the housing and orbit gear in one event and the carrier in another event against rotation.

18. A power transmission mechanism as set forth in claim 13, including an annular member embracing the external teeth on associated runners and arranged so that the internal teeth thereon may be selectively interlocked with the external teeth on said runner extensions, said annular member being free wheelingly connected with the sun gear, for driving the sun gear from a selected runner but permitting the sun gear to at times overrun the driving shaft.

19. A power transmission mechanism as set forth in claim 13 including an automatic clutch having a driving member free wheelingly connected with said carrier and a driven member rotatable with the sun gear whereby when said sun gear and said driving member are synchronized they will be locked for corotation while permitting the sun gear at an excess speed to overrun the driving member.

20. A power transmission mechanism as set forth in claim 13 including an automatic clutch having a driving member free wheelingly connected with said carrier and a driven member rotatable with the sun gear whereby when said sun gear and said driving member are synchronized they will be locked for corotation while permitting the sun gear at an excess speed to overrun the driving member, said clutch driving member, said carrier and said driven shafts being arranged when appropriately shifted to selective interlocking connections with the driven shaft, for varying the speed and rotative direction of the driven shaft.

21. A power transmission mechanism as set forth in claim 13 including an automatic clutch having a driving member free wheelingly connected with said carrier and a driven member rotatable with the sun gear whereby when said sun gear and said driving member are synchronized they will be locked for corotation while permitting the sun gear at an excess speed to overrun the driving member, said clutch driving member, said carrier and said driven shafts being arranged when appropriately shifted to selective interlocking connections with the driven shaft, for varying the speed and rotative direction of the driven shaft, a first stationary case at the driving end and a second stationary case at the take-off end of the planetary unit, and cooperating means on walls of said cases and the end walls of said housing for at times locking the planetary unit against bodily rotation when said housing and said driven shaft are shifted axially.

REX. E. KELLER.

REFERENCES CITED

The following references are of record in the file of this patent:

UNITED STATES PATENTS

| Number | Name | Date |
| --- | --- | --- |
| 2,093,236 | Dodge | Sept. 14, 1937 |
| 2,146,369 | Dodge | Feb. 7, 1939 |
| 2,190,831 | Dodge | Feb. 20, 1940 |
| 2,203,177 | Patterson | June 4, 1940 |
| 2,242,515 | Dodge | May 20, 1941 |
| 2,293,358 | Pollard | Aug. 18, 1942 |
| 2,301,451 | Pollard | Nov. 10, 1942 |
| 2,352,004 | Pollard | June 20, 1944 |
| 2,378,035 | Pollard | June 12, 1945 |
| 2,388,062 | Keller | Oct. 30, 1945 |